United States Patent [19]
Naito

[11] Patent Number: 5,780,980
[45] Date of Patent: Jul. 14, 1998

[54] ELECTRIC CAR DRIVE SYSTEM PROVIDED WITH HYBRID BATTERY AND CONTROL METHOD

[75] Inventor: Shotaro Naito, Hitachinaki, Japan

[73] Assignee: Hitachi, Ltd., Tokyo, Japan

[21] Appl. No.: 630,080

[22] Filed: Apr. 9, 1996

[30] Foreign Application Priority Data

Apr. 14, 1995 [JP] Japan ................. 7-089435

[51] Int. Cl.⁶ ........................................ H02P 1/00
[52] U.S. Cl. ..................... 318/139; 318/109; 307/19; 307/46
[58] Field of Search ................ 318/139, 105, 318/106, 109; 180/65.1–65.8; 307/4, 6, 8, 10.7, 18–21, 23–25, 28, 29, 43–46, 72, 75; 320/3–6

[56] References Cited

U.S. PATENT DOCUMENTS

| | | | |
|---|---|---|---|
| 3,686,549 | 8/1972 | Winebrener | 318/139 |
| 3,987,352 | 10/1976 | Hirota | 320/3 |
| 4,025,860 | 5/1977 | Shibata et al. | 320/3 |
| 4,056,764 | 11/1977 | Endo et al. | 320/3 |
| 4,066,936 | 1/1978 | Hirota | 318/139 |
| 4,237,410 | 12/1980 | Erickson et al. | 320/14 |
| 4,325,010 | 4/1982 | Lowndes | 318/139 |
| 4,348,628 | 9/1982 | Loucks | 320/61 |
| 4,413,698 | 11/1983 | Conrad et al. | 180/305 |
| 4,689,531 | 8/1987 | Bacon | 318/139 |
| 4,962,462 | 10/1990 | Fekete | 364/492 |
| 5,248,566 | 9/1993 | Kumar et al. | 429/19 |
| 5,290,641 | 3/1994 | Harashima | 429/17 |
| 5,413,878 | 5/1995 | Williams et al. | 429/16 |
| 5,488,283 | 1/1996 | Dougherty et al. | 320/15 |
| 5,500,579 | 3/1996 | Kim et al. | 318/493 |
| 5,525,891 | 6/1996 | Meyer et al. | 320/15 |
| 5,612,012 | 3/1997 | Soma et al. | 423/246 |

*Primary Examiner*—Brian Sircus
*Attorney, Agent, or Firm*—Antonelli, Terry, Stout & Kraus, LLP

[57] ABSTRACT

In an electric car drive system having a car drive motor powered by a mounted direct current power supply, a control system including a signal generating means is provided to generate signals which control motor speed. The direct current power supply is composed of a power battery having secondary cells connected to the motor and an energy battery formed by fuel cells connected in parallel to said power battery via an energy battery control switch. The electric car drive system is composed of a charge control means which charges the power battery using the energy battery if the charge of the power battery is below the specified value when said key switch is turned off, and suspends charging if the charge is equal to or greater than the specified value. A battery current and voltage control controls a voltage increasing circuit connected between the energy battery and the power battery based on the current or voltage of any one of the power battery, energy battery or motor and keeps the voltage of the direct current power supply within a specified range.

14 Claims, 9 Drawing Sheets

ELECTRIC CAR DRIVE SYSTEM PROVIDED WITH HYBRID BATTERY AND CONTROL METHOD

BACKGROUND OF THE INVENTION

The present invention relates to an electric car drive system and a drive control method thereof, and particularly to an electric car drive system and control method suitable to an electric car driven by a motor powered by a hybrid battery.

An electric car generally comprises an inverter to convert a mounted direct current power supply into an alternating current power supply of variable voltage and frequency; a car driving three-phase alternating current motor; a current sensor and speed sensor to sense the current and speed of the three-phase alternating current motor; a torque command calculating means to determine a three-phase alternating current motor torque command according to the extent of accelerator actuation; a three-phase alternating current command generating means to generate a three-phase alternating current command based on said torque command and said current sensor output; and a signal generating means to generate a signal to control the inverter based on said three-phase alternating current command and current flowing to said three-phase alternating current motor.

Such an electric car is finding use in extensive fields as a clean car which provides harmony with the environment without discharging exhaust gas containing hazardous substances causing air pollution. The Dec. 1992 issue of "Kagaku Kogyo (Chemical Industry)" issued by Chemical Industry Co., Ltd. (pp. 69–74) introduces a new trend in battery development entitled "Trend of electric car battery development".

Generally, secondary batteries, lead batteries in particular, are extensively used as electric car batteries. However secondary batteries fail to ensure a long traveling distance per charge, and this defect is one of the major factors hindering a more widespread use of electric cars.

In recent years, attention has been drawn to the normal temperature type fuel battery, including a solid high molecular fuel battery, for use as an electric car battery to replace the secondary battery. The fuel battery obtains energy by electrochemical reaction of hydrogen and oxygen in the fuel. It ensures a long term operation while fuel is supplied.

Furthermore, the exhaust gas of the battery is clean. For the output of the normal temperature type fuel battery which is put into commercial use, however, the output voltage of the battery cell is one volt, or the output power is about 1 W/cm². Thus, the output voltage is too small for use as an electric car battery, which is required to provide an extensive range of output power, not only for low load operation, but also for high load operation.

A hybrid battery technology is disclosed in Japanese Patent Application Laid-open No. SHO 47-32321 and Japanese Patent Application Laid-Open No. HEI 6-124720, where both the fuel battery and secondary battery are used if a large amount of current flows to the motor; and the secondary battery is charged by the surplus power of the fuel battery if not much current is used, thereby ensuring that the battery will withstand the next big load to be absorbed.

A power supply based on such a hybrid battery system provides an electric car battery which makes up for the disadvantages of the secondary battery and the normal temperature type fuel battery and meets the extensive output requirements for operation of a car. Whereas the rated voltage of the secondary battery is normally 300 volts, that of the fuel battery is 24 volts to 96 volts, and is normally 48 volts. In an electric car having a conventional hybrid battery, not much attention has been given to the big difference in rated voltages. Thus, satisfactory achievements have not been obtained from the viewpoint of traveling characteristics and traveling distance.

SUMMARY OF THE INVENTION

The object of the present invention is to provide a drive system and a drive control method for electric cars capable of a long traveling distance, which the meets the extensive output requirements from low to high loads, using a hybrid battery consisting of a combination of a secondary battery and a fuel battery as an electric car battery, by giving consideration to the difference of rated voltages between the fuel battery and the secondary battery and by providing an optimum configuration through effective use of the characteristics of both batteries.

According to a characteristic of the present invention, in an electric car drive system having a car drive motor powered by a mounted direct current power supply, and a control system including a signal generating means to generate signals which control said the motor speed, the direct current power supply is composed of:

a power battery comprising secondary cells connected to said motor, and an energy battery comprising fuel cells connected in parallel to said power battery via a voltage increasing circuit; and the electric car drive system further comprises:

a battery current and voltage control means which controls said voltage increasing circuit based on the current or voltage of any one of said power battery, said energy battery and said motor, and keeps the voltage of said direct current power supply within a specified range; and a charge control means which charges said power battery using said energy battery, if the charge of said power battery is below a specified value, and suspends charging of said power battery if said charge is equal to or greater than the specified value.

According to another characteristic of the present invention, the energy battery is provided with a drive pump to supply fuels and discharge reaction products. This drive pump is characterized in that it is powered by the power battery at the time of startup. Also, the electric car has auxiliary equipment including an air conditioner motor, power steering motor and vacuum motor, and the auxiliary equipment is driven by said energy battery operating as its power source.

According to still another characteristic of the present invention, when the electric car is in the regenerative mode of recovering braking energy, the operation of said voltage increasing circuit is turned off to suspend charging of said power battery by said energy battery, which is intended to improve the efficiency of recovering the braking energy into said power battery.

According to the present invention, currents or voltages of any two of the energy battery, the power battery connected in parallel with the energy battery and said motor are detected and controlled by the battery current and voltage control means, and voltages serving as the direct current power supply are kept within the specified range.

Furthermore, said power battery is charged by said energy battery if the charge of said power battery is below a specified value, and charging of the power battery is suspended if said charge is equal to or greater than the specified value.

According to the present invention, electric power for car operation is supplied mainly by the energy battery through a booster when the electric car load is small. When greater power is required by increased load of the electric car, power is supplied to the three-phase alternating current motor mainly from the power battery.

Power of the low-voltage energy battery, producing a constant output at all times, is boosted and supplied to the high-voltage power battery to charge it. This ensures a long-time traveling of the car, while meeting the requirements for an extensive range of loads from low to high loads.

In particular, the power of the power battery is used to supply the car with a driving force for big load fluctuations; whereas the power of the energy battery, which provides a constant output for a long period of time, is used for the auxiliary equipment, which provide little load fluctuations. This extends the traveling distance, and provides a power supply having a compact design. Furthermore, it is possible to meet the requirements for an extensive range of loads from low to high loads, and to improve the traveling characteristics.

DETAILED DESCRIPTION OF THE PREFERRED EMBODIMENTS

One embodiment of the present invention will be described with reference to FIG. 1, which is a block diagram representing an electric car drive system.

Figure 1:
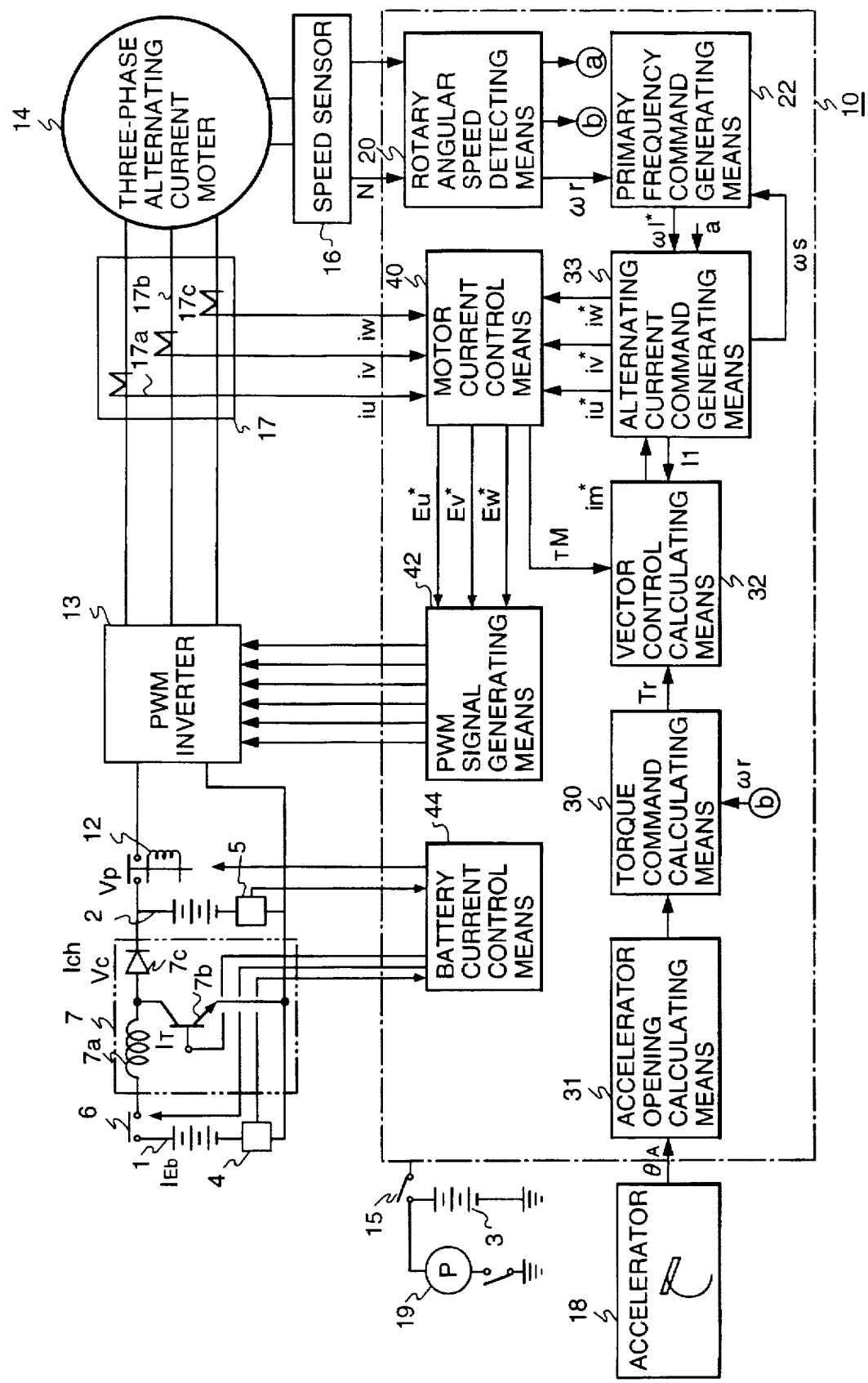
FIG. 1 is a block diagram representing the electric car drive controller of the present invention.

In FIG. 1, the main power supply mounted on the electric car is a direct current power supply comprising an energy battery 1 connected in parallel with a power battery 2. A fuel battery producing a constant output at all times is used as the energy battery 1, while a lead battery, which is a secondary battery, is used as the power battery 2. Numeral 3 denotes an auxiliary battery to back up the controller 10. Numeral 4 indicates an energy battery current and voltage detector to detect the current and voltage of the energy battery 1, 5 denotes a power battery current and voltage detector to detect the current and voltage of the power battery 2, and 6 denotes an energy battery relay. Numeral 7 represents a voltage increasing circuit to charge the power battery 2 by boosting the voltage of the energy battery 1. Numeral 12 shows a main contactor to open and close the main power supply circuit, and 13 denotes an inverter for use as a power switching element to convert the direct current of the batteries 1 and 2 into an alternating current. Numeral 14 represents a three-phase alternating current motor to drive the electric car, 15 denotes a key switch and 16 denotes a speed sensor to detect the speed N of motor 14. Also, (17a, 17b and 17c denote current sensors of a current detector 17 for detecting the three-phase primary current i (iu, iv and iw) flowing to the primary winding of the alternating current motor 14.

Numeral 18 designates an accelerator switch which operates to generate an output qA according to the amount of actuation of the accelerator when it is being pressed. Numeral 19 represents a pump to feed fuel pump to the energy battery 1 and to discharge reaction products.

The voltage increasing circuit 7 comprises a switching transistor 7b to short-circuit the energy battery 1, reactor 7a and reverse flow preventive diode 7c. The rated voltage of power battery 2 is 300 volts, and that of the energy battery is 48 volts. The voltage VE of the energy battery 1 is boosted by the voltage increasing circuit 7 to a level equal to or a little higher than the voltage VP of the power battery 2, thereby charging the power battery 2 with the energy battery 1 and providing power for the three-phase alternating current motor 14 to drive the electric car.

Controller 10 comprises a rotating angular speed detecting means 20, primary frequency command generating means 22, torque command calculating means 30, accelerator opening calculating means 31, vector control calculating means 32, alternating current command generating means 33, current and voltage control means 40, PWM signal generating means 42, and battery current and voltage control means 44.

The controller 10 receives the signals for motor speed N, motor current i and accelerator opening $\theta A$, and the torque command calculating means 30 calculates the torque command Tr. The primary frequency command generating means 22 calculates primary angular frequency $\omega_1{}^*$, and the vector control calculating means 32 calculates the vector control. Also, the primary angular frequency $\omega_1{}^*$ and alternating current command $I_1$ are used by the current and voltage control means 40 and the alternating current command generating means 33 to carry out processing, such as current control and alternating current command calculation, thereby generating PWM signals through the PWM signal generating means 42. The inverter 13 driven on the basis of this PWM signal forms the three-phase alternating current power of variable voltage and frequency from the direct current of the energy battery 1 and power battery 2, thereby controlling the torque of the three-phase alternating current motor 14.

The rotating angular speed detecting means 20 detects the angular frequency $\omega r$ ($\omega=2p$, N/60) of the three-phase alternating current motor 14 from pulses of phases A and B of the output N of the speed sensor 16. The torque command calculating means 30 generates the torque command $\tau r$ given to the three-phase alternating current motor 14, using as inputs a value corresponding to the amount of actuation of the accelerator $\theta A$ obtained by the accelerator opening calculating means 31 and the motor angular frequency $\omega r$ obtained by the rotating angular speed detecting means 20.

The vector control calculating means 32 generates torque current It*, using as inputs the exciting motor command im and motor torque τM. The alternating current command generating means 33 generates current command i* (iu*, iv* and iw*) for the current and voltage control means 40, based on the alternating current command $I_1$ and the primary angular frequency ω1*. Based on inputs representing the current command i* and motor current i, the current and voltage control means 40 produces reference signals Eu*, Ev* and Ew* in order to obtain the motor torque τM.

The PWM signal generating means 42 compares the triangular wave with the reference signals Eu*, Ev* and Ew* to get the PWM signals, which serve as gate signals for six power elements constituting an arm of the PWM inverter 13.

Based on the battery current and voltage detectors 4 and 5, the battery current and voltage control means 44 provides control to ensure that the current and voltage of the energy battery 1 and power battery 2 are kept within the specified range. If the current and voltage have exceeded the specified tolerance or have fallen below the tolerance, it opens either the relay 6 or main contactor 12, or actuates the voltage increasing circuit 7, to provide control to ensure that the current and voltage are kept within a specified range. Details of this control will be described later.

Figure 2:
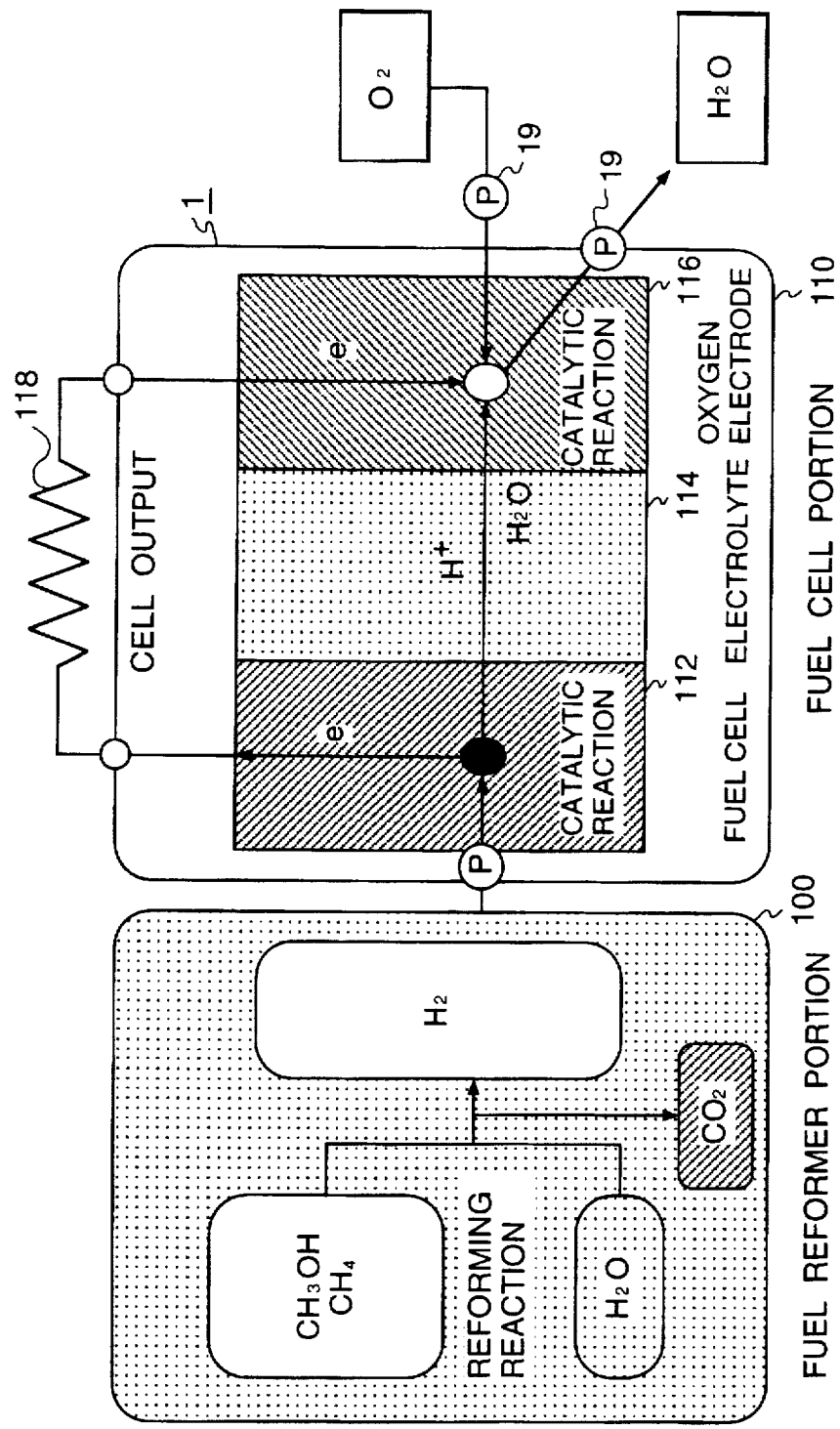
FIG. 2 is a diagram showing an example of the energy battery of FIG. 1.

FIG. 2 represents an embodiment of the energy battery 1. The energy battery 1 comprises a fuel reformer portion 100 and fuel cell portion 110. The fuel reformer portion 100 generates $H_2$ gas through reforming reaction between methanol $CH_3OH$ and/or methane $CH_4$ and water $H_2O$. The fuel cell portion 110 has a fuel electrode 112, electrolyte 114, oxygen electrode 116 and output portion 118, and a cell output of about 1 W/cm$^2$ per cell is supplied to the output portion 118 by catalytic reaction, using as material the hydrogen gas supplied by the pump 19 and oxygen gas. Also, water ($H_2O$) generated by the reaction is discharged by pump 19. As long as material is supplied, the output portion 118 produces a constant cell output at all times from the energy battery 1. The pump 19 is driven under specified conditions even when the key switch 15 is turned off. The details of this will be described later.

Figure 3:
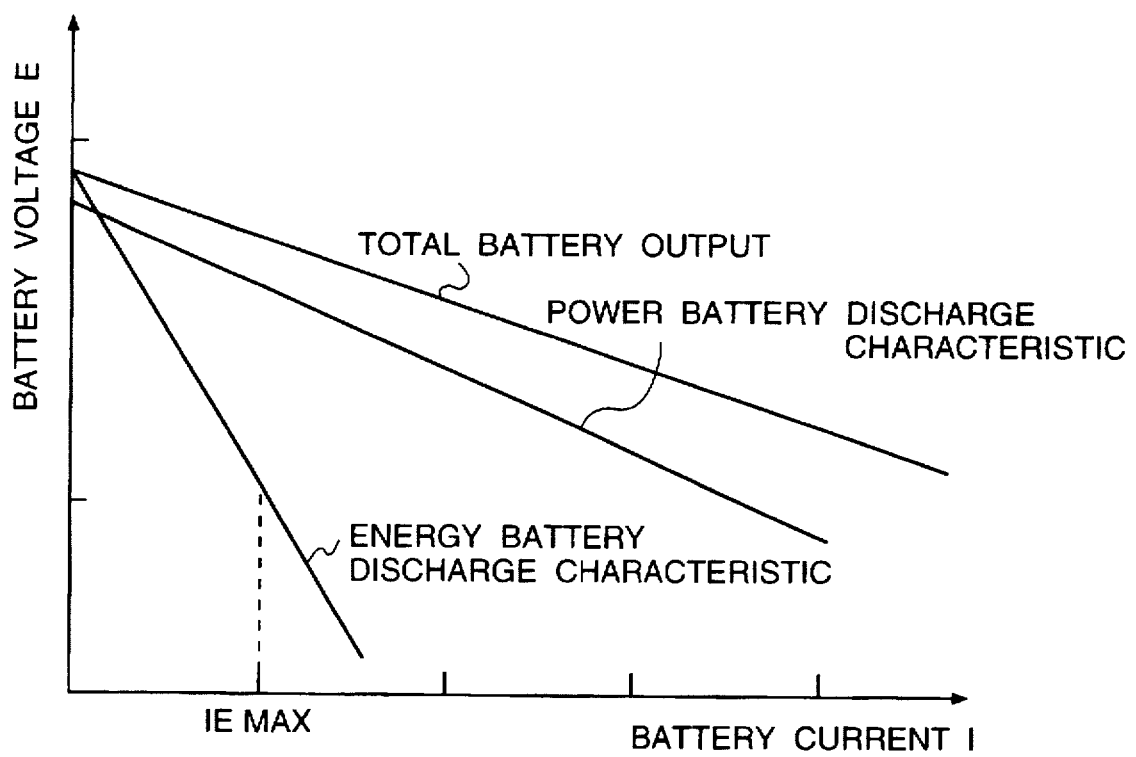
FIG. 3 is a graph representing the characteristics of the battery constituting the main power supply.

FIG. 3 illustrates the characteristics of the energy battery 1 and power battery 2. According to the present invention, voltage VP of the power battery 2 can be maintained at a higher level, up to the high current range, than the voltage VC, resulting from boosting of the voltage of the energy battery 1. Under no-load conditions, however, the voltage VC resulting from boosting of the voltage of the energy battery 1 is set to be higher than the voltage VP of the power battery 2. Accordingly, when the car is running at a smaller load, the electric power required to operate the motor 14 is mainly supplied by the energy battery 1. When greater power is required due to an increase in the car load, the electric power for the motor 14 is mainly supplied by the power battery 2.

The voltage increasing circuit 7 provides control so that the discharging current of the energy battery 1 is at least $I_{EMAX}$.

When the power battery 2 becomes discharged, the power battery 2 is charged by the energy battery 1. For this purpose, the voltage increasing circuit 7 is actuated to open the main contactor 12 and to boost the voltage of the energy battery 1, thereby supplying power to the power battery 2. In this case, the voltage increasing circuit 7 provides control to ensure that the current of the energy battery 1 detected by the battery current and voltage detector 4 is equal to or smaller than $I_{EmAx}$. When the charging rate of the energy battery 1 has reached a specified value (within the range from 90 per cent to 100 per cent, normally), the operation of the voltage increasing circuit 7 is turned off to stop the charging. After charging the power battery 2, the relay 6 is turned off. In this case, the current flowing from energy battery 1 is restricted to the level equal to or smaller than $I_{EMAX}$. Charging of the power battery 2 should be done when the electric car does not require power.

Figure 4:
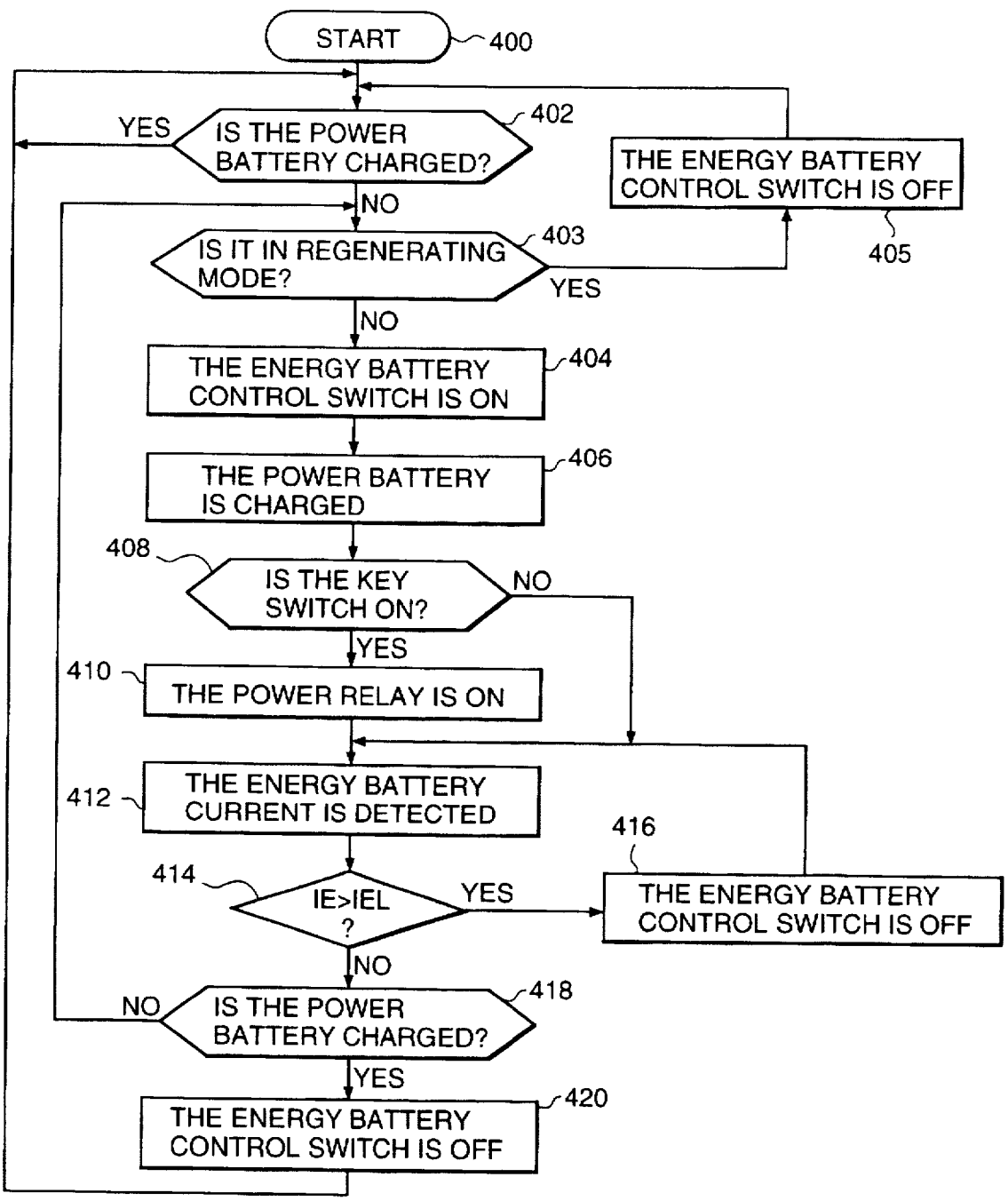
FIG. 4 is a flow diagram representing the operation of the battery power and voltage control arrangement of FIG. 1.

FIG. 4 illustrates the operation of the battery current and voltage control means 44 of the controller 10. A check is made to see if the key switch 15 is off and if the voltage $E_P$ of the power battery 2 detected by the power battery current and voltage detector 5 is equal to or greater than the specified voltage $E_{PC}$ (Step 402). When the value is equal to or greater than the specified voltage $E_{PC}$, further control is not necessary.

When the voltage $E_P$ of the power battery 2 is below the specified voltage $E_{PC}$ a check is made to see if the electric car is in the regenerative mode to recover braking energy (Step 403). If it is in the regenerative mode, the operation of the voltage increasing circuit 7 is turned off to suspend charging of the power battery 2, which is intended to improve the efficiency of recovery of the braking energy into said power battery. If the electric car is not in the regenerative mode, the voltage increasing circuit 7 is turned on to implement charging of the power battery 2 (Steps 404 to 406). When the switch 15 turns on, the relay 6 and main contactor 12 are actuated to feed power to the motor 14 from the energy battery 1 and power battery 2 (Steps 408 to 410). In this case the current flowing from the energy battery 1 is restricted to $I_{Emax}$ or less. This control is performed by the voltage increasing circuit 7 being driven when the battery current detected by the energy battery current and voltage detector 4 is reduced to $I_{Emax}$ or less (Steps 412 to 416).

Figure 5:
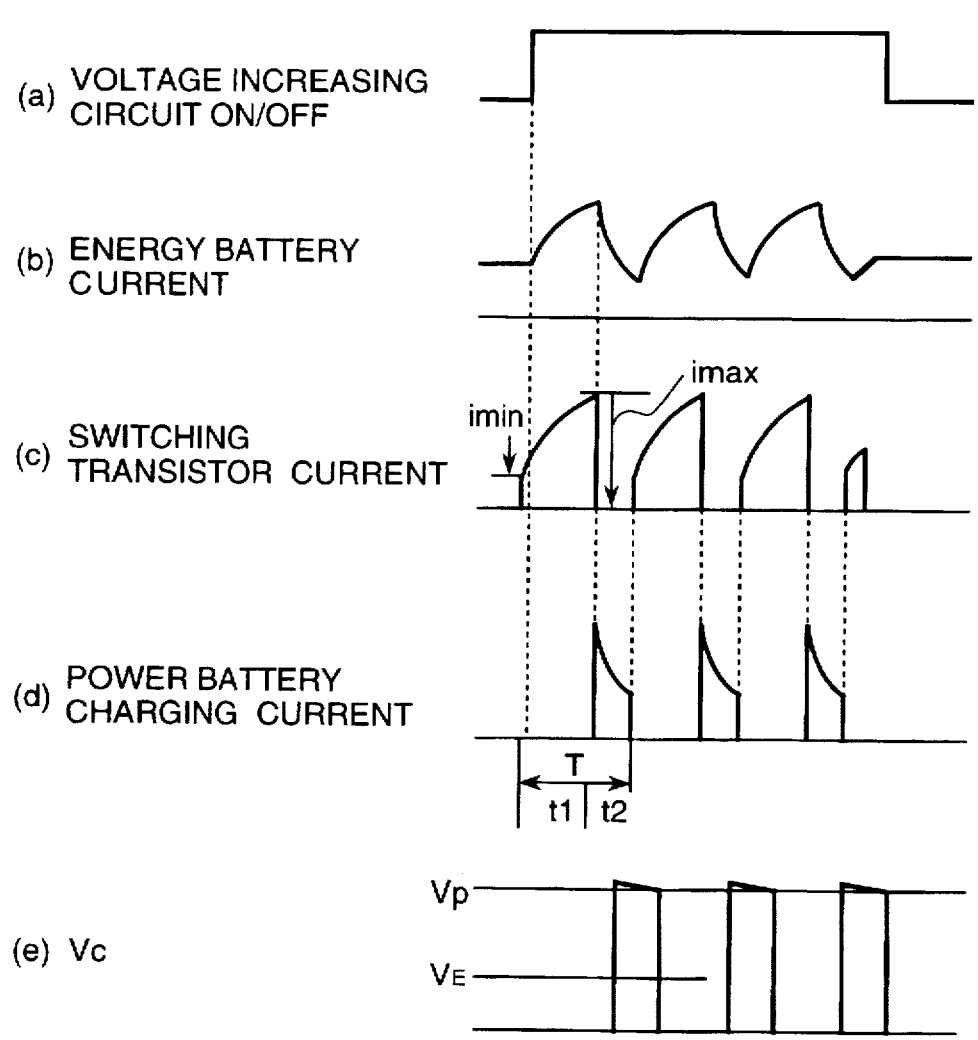
FIG. 5 is a waveform diagram illustrating the voltage increasing circuit operation.

The following describes the operation of the voltage increasing circuit 7 with reference to FIG. 5. When the voltage increasing circuit 7 is actuated, the switching transistor 7b repeats on/off operations at the specified period T (t1+t2), as shown line (a) of the Figure. When the switching transistor 7b is on, the current $I_{Eb}$ of the energy battery undergoes changes as shown in line (b) of the Figure, the energy battery is short-circuited via the reactor 7a and the current $I_T$ flowing to the transistor 7b undergoes changes between $I_{min.}$ and $I_{max.}$, as shown in line (c) of the Figure. When the switching transistor 7b is turned off, the voltage of the voltage reactor 7a is superimposed, and is supplied to the power battery via the reverse flow preventive diode 7c. The charging current I CH and charging voltage VC at this time are changed as shown in lines (d) and (e) of the Figure. Charging is carried out when charging voltage VC is higher than the voltage VP of the power battery.

The following describes the relationship between the energy battery VE, charging current $I_{CH}$ and charging voltage VC.

$$\frac{1}{2} L_{imax}^{-2} + V_{T2} \times \frac{i_{max} \times i_{min}}{2} \times \frac{t_2}{T} = V_p \times \frac{i_{max} + i_{min}}{2} \times \frac{t_2}{T} \quad \text{Expression 1}$$

$$\bar{I}_{CH} = \frac{i_{max} + i_{min}}{2} \times \frac{t_2}{T}$$

$$\frac{1}{2} L_{imax}^2 + V_{T2}\bar{I}_{CH} = V_p\bar{I}_{CH}$$

$$\frac{1}{2} L_{imax}^2 = \bar{I}_{CH}(V_p - V_{T2})$$

When the energy battery 1 is discharged and voltage is low, the operation of the voltage increasing circuit 7 is suspended, and power is supplied to the motor 14 only from the power battery 2.

Charging of the power battery 2 is detected by the power battery current and voltage detector 5. When the voltage EP of the power battery 2 has reached the specified voltage EP or more, the voltage increasing circuit 7 is stopped so as to suspend charging by the energy battery 1 (Steps 418 to 420). In a similar way, the energy battery 1 and power battery 2 operating as power sources to provide electric power to the car are controlled to ensure that the current and voltage are kept within a specified range.

When the charge amount of the power battery 2 is below the specified value, the pump 19 is driven to generate the output of the energy battery 1 to change the power battery 2 even if the key switch 15 is off. When the charge amount of the power battery 2 has reached the specified value, charging is stopped.

If any failure has occurred to the energy battery 1, for example, if heat is generated or fuel replenishment is required, then the relay 6 is turned off.

Figure 6:
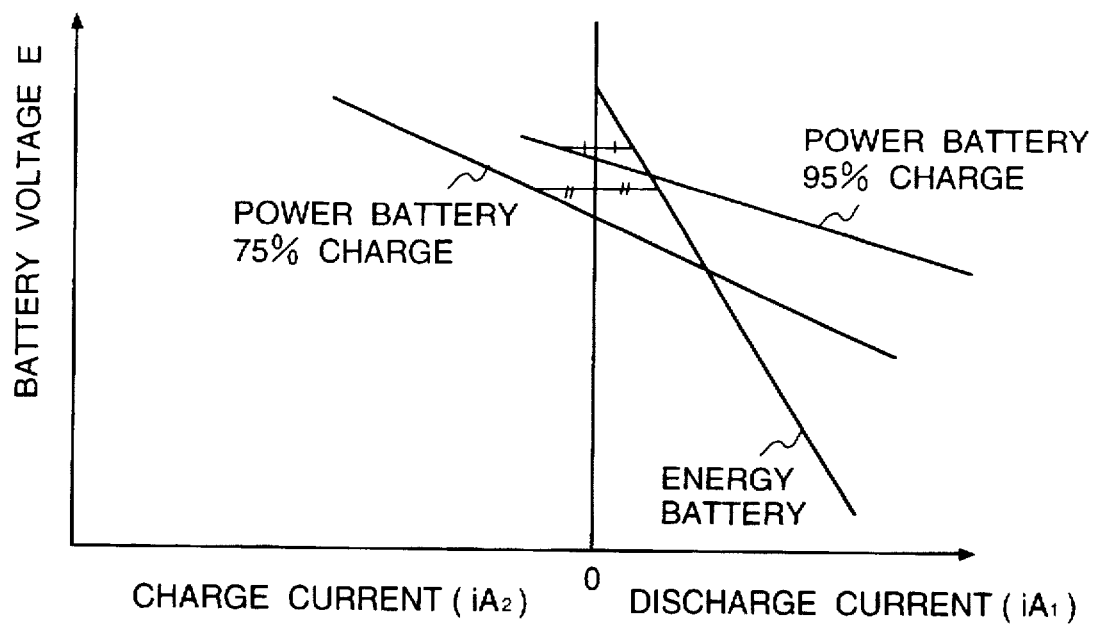
FIG. 6 is a graph showing the charging characteristics of the energy battery and power battery.

FIG. 6 shows the charging/discharging characteristics of the power battery 2 and energy battery 1. For example, when the charging rate of the power battery 2 is 75 per cent, a current iA flows from the energy battery 1 to the power battery 2, since the voltage of the energy battery 1 is high. When discharging current iA1 has become equal to the charging current iA2, a balance occurs between the charging current and the discharging current.

Figure 7:
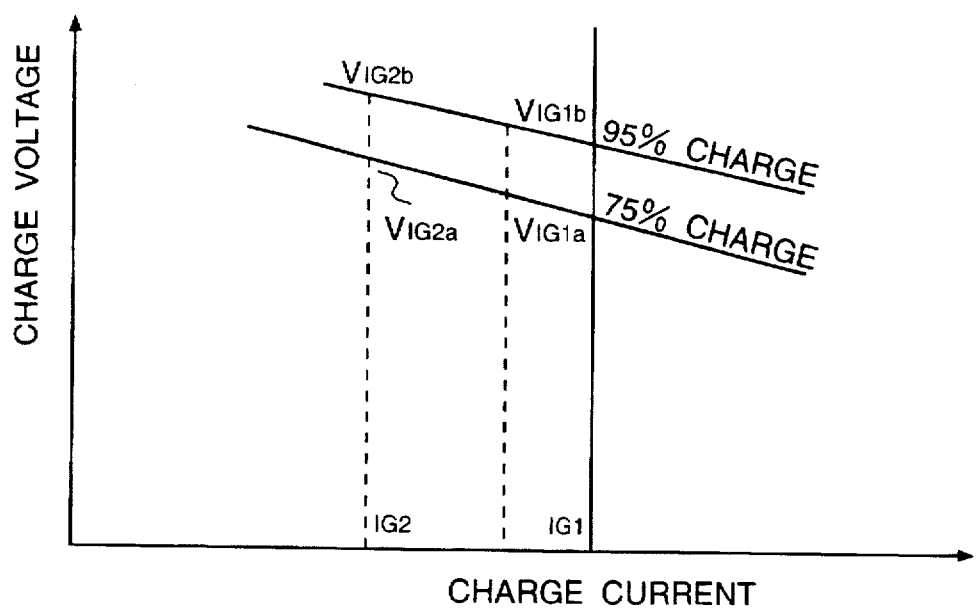
FIG. 7 is a graph showing how to detect the charging of the power battery.

Charging of the power battery 2 is detected by the power battery current and voltage detector 5. FIG. 7 shows how to detect the charging of the power battery 2. Charging of the power battery 2 is determined by detecting the voltage ViG when a certain amount of charging current $IG_1$ flows. If the voltage is $ViG_1a$ when charging current $IG_1$ flows, the charging rate is 75 per cent. If the voltage is $ViG_1b$, the charging rate is 95 per cent. In the same way, when the voltage is $ViG_2a$ when charging current $IG_2$ flows, the charging rate is 75 per cent. If the voltage is $ViG_2b$, the charging rate is 95 per cent. For example, power should be controlled such that charging is started when the charging rate is reduced below 75 per cent; and charging is stopped when the charging rate has reached about 95 per cent.

For the electric car drive motor according to the present invention, the alternating current motor may be replaced by a direct current motor. Also, a direct current power supply can be used for the alternating current motor, and means other than an inverter may be used to convert direct current into alternating current power of variable voltage and frequency.

Also, in the control for maintaining the current and voltage of the energy battery 1 and power battery 2 within the specified range by the battery current and voltage control means 44, control may be provided by obtaining the required control information through calculation from either the current or voltage of any one of the battery current and voltage detectors 4 and 5, and the primary current i flowing to the alternating current motor 14, in addition to using the output of the battery current and voltage detectors 4 and 5. For example, the charging of the three-phase alternating current motor 14, as well as the current/voltage conditions of the batteries 1 and 2, can be determined from the output of the energy battery current and voltage detector 4 and the primary current i flowing to the primary winding of the three-phase alternating current motor 14, allowing the same control as the above to be implemented.

Figure 8:
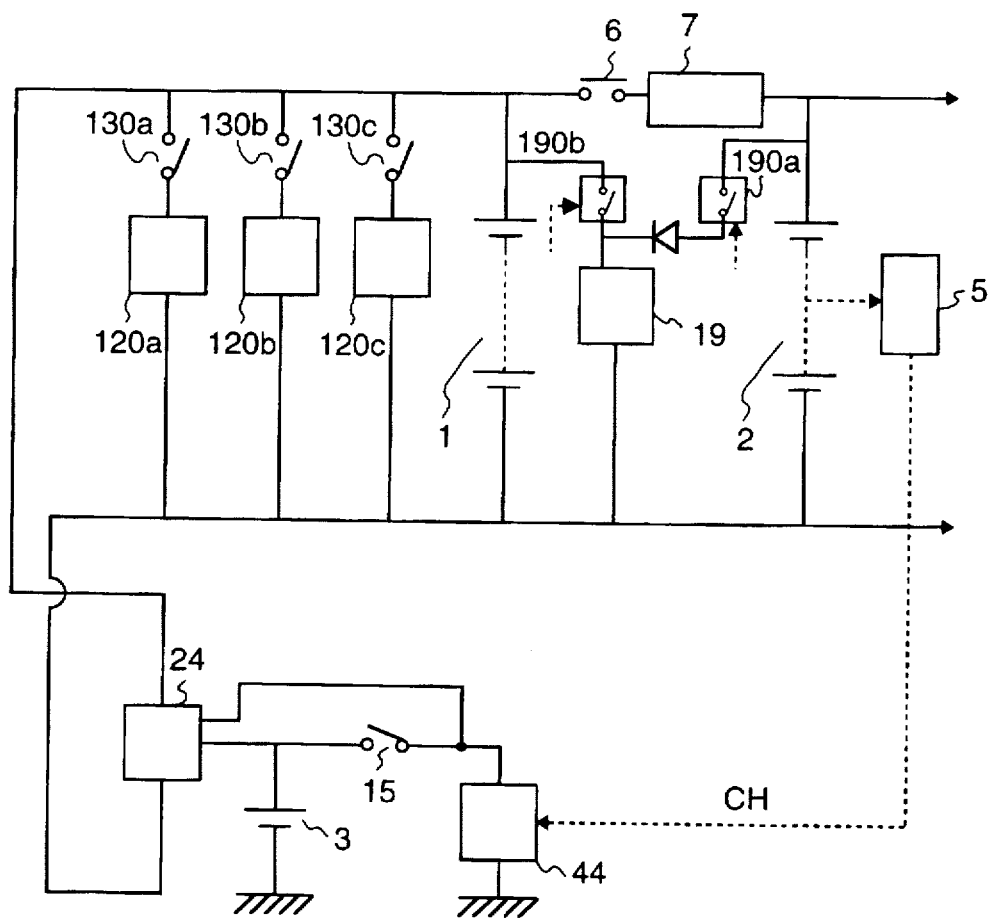
FIG. 8 is a schematic diagram showing another example of the controller of the energy battery in the arrangement of FIG. 1.

FIG. 8 shows another example of the controller of the energy battery constituting the hybrid battery in the arrangement of FIG. 1. Numeral 15 represents a key switch, 19 denotes an energy battery pump drive pump motor, and 24 denotes a DC/DC converter. Numeral 120 denotes an energy battery load comprising an air conditioner motor 120a, power steering motor 120b and vacuum motor 120c. Also, numeral 130 denotes an energy battery load relay arrangement, comprising an air conditioner relay 130a, power steering relay 130b and vacuum relay 130c. Furthermore, the first relay (RLf1) 190a and the second relay (RLf2) 190b are included as energy battery drive pump motor relays.

The following describes operation of the hybrid battery controller shown in FIG. 8.

Figure 9:
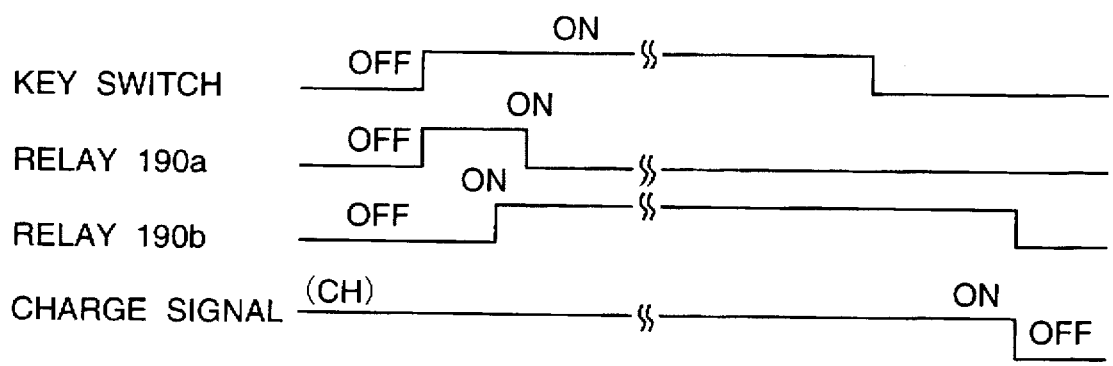
FIG. 9 is a time chart showing the operation of the controller of FIG. 8.

According to this embodiment, the drive pump 19 of the energy battery 1 uses the power battery 2 for startup. To describe the operation with reference to FIG. 9, the key switch 15 is off before startup, and both the energy battery pump drive pump motor relays 190 (the first relay 190a and second relay 190b) are also off. When the key switch 15 is turned on at the time of startup, the first relay 190a is turned on to supply power to the motor of the drive pump 19 from the power battery 2. This causes the energy battery drive pump 19 to supply material to the energy battery, i.e., the fuel cell, resulting in an output being generated from the energy battery 1. This is accompanied by actuation of the second relay (RLf2) 190b so that power is supplied to the motor of the energy battery drive pump 19 from the energy battery 1. At the same time, the power battery 2 is charged by the energy battery 1. After the energy battery 1 is able to generate sufficient output, the first relay 190a turns off.

As described above, the second relay 190b self-holds after startup of the energy battery 1. The operation of this energy battery continues even if the key switch 15 is turned off to stop the car operation after that. The power battery 2 is continued to be charged by the energy battery 1 until the voltage of the power battery 2 detected by the power battery current and voltage detector 5 reaches the specified value.

The loads of the energy battery 1, for example, the air conditioner motor 120a, the power steering motor 120b and the vacuum motor 120c are connected to the energy battery 1 via the load relays, namely, the air conditioner motor relay 130a, power steering motor relay 130b and vacuum motor relay 130c. It goes without saying that each load is provided with a relay which provides independently a control of the operation/stop condition, in addition to the relays corresponding to the energy battery 1.

These auxiliary devices are supplied with power from the energy battery 1. The power battery 2 is used to drive the car, which is subjected to great load fluctuations, and the auxiliary device with less load fluctuations, such as the air conditioner, uses the power of the energy battery 1, which provides a constant power for a long time. This is intended to extend the maximum traveling distance of the car and to ensure a compact configuration of the power supply. Also, it is possible to meet the requirements for an extensive range of loads from low to high loads, and to improve the traveling characteristics.

The DC/DC converter 24 uses the power of the energy battery 1 to charge the auxiliary battery 3. This charging control is performed while the voltage of the auxiliary battery 3 is monitored by the battery current and voltage control means 44.

Figure 11:
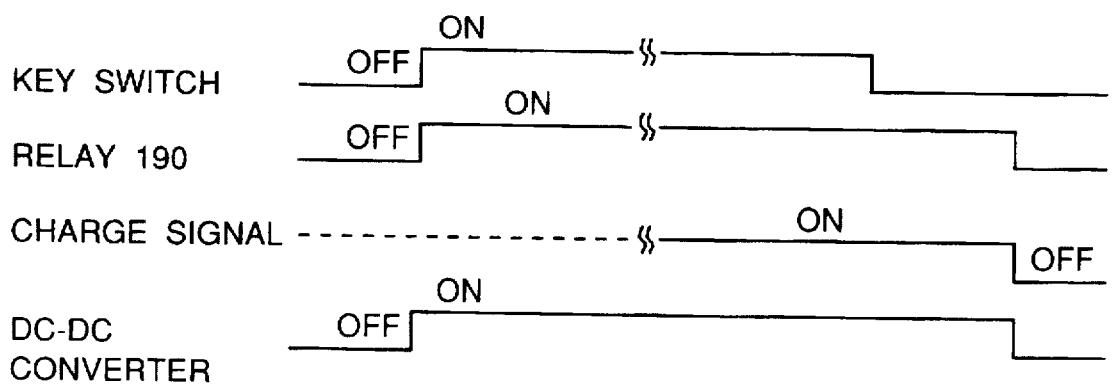
FIG. 11 is a time chart showing the operation of the controller of FIG. 10.
Figure 10:
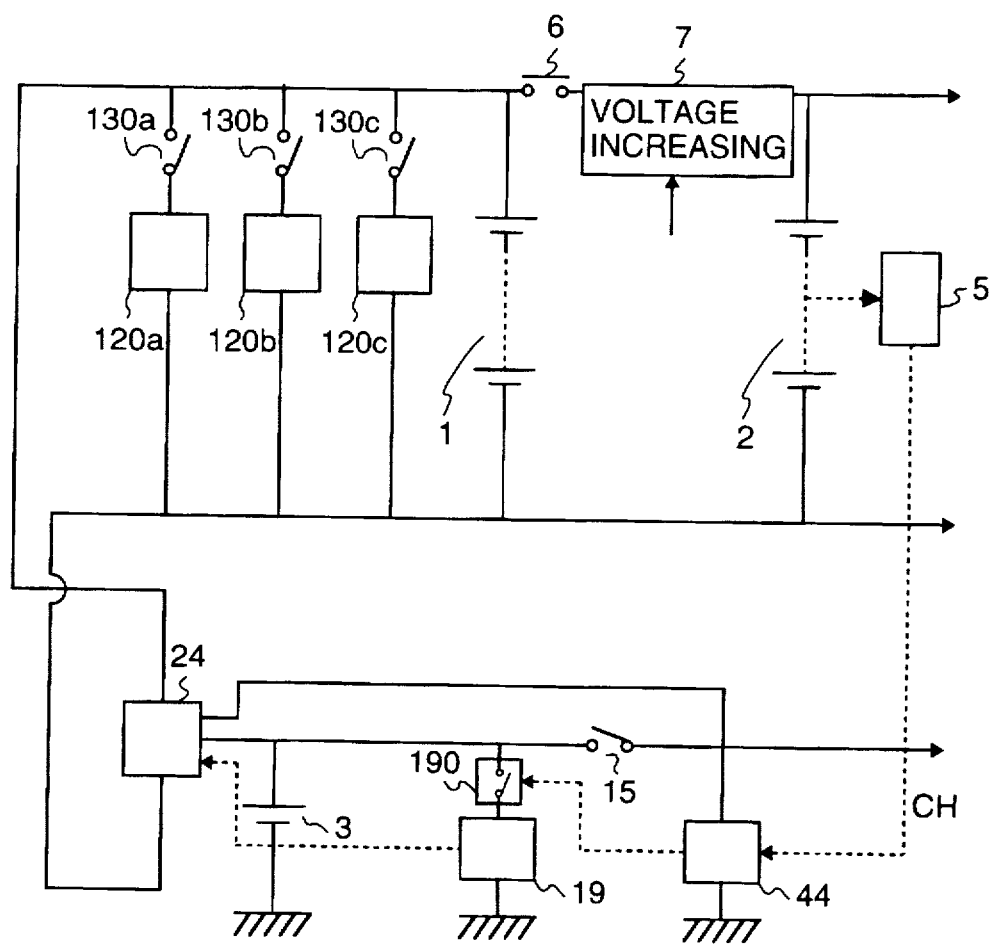
FIG. 10 is a schematic diagram showing still another example of the controller of the energy battery in the embodiment of FIG. 1.

FIG. 10 shows another example of the controller of the energy battery 1 in the arrangement of FIG. 1. According to this example, the auxiliary battery 3 depends on the drive pump 19 of the energy battery 1 for power. To describe the operation with reference to FIG. 11, the key switch 15 is off before startup, and drive pump motor relays 190 for the energy battery pump 19 are also off. When the key switch 15 is turned on at the time of startup, the relays 190 are turned on to supply power to the motor of the drive pump 19 from the auxiliary battery 3. This causes the energy battery drive pump 19 to supply material to the energy battery, i.e., the fuel cell, resulting in an output being generated from the energy battery 1. This is accompanied by the power battery 2 being charged by the energy battery 1. The operation of this energy battery continues even if the key switch 15 is turned off to stop the car operation after that. The power battery 2 is continued to be charged by the energy battery 1 until the voltage of the power battery 2 detected by the power battery current and voltage detector 5 reaches the specified value.

Similarly to the case of FIG. 8, the loads of the energy battery 1 are connected to the energy battery 1 via the load relays, namely, the air conditioner motor relay 130a, power steering motor relay 130b and vacuum motor relay 130c, which are supplied with power by the energy battery 1. Also, the DC/DC converter 24 uses the power of the energy battery 1 to charge the auxiliary battery 3. Similarly to the case of the power battery 2, this charging control is performed while the voltage of the auxiliary battery 3 is monitored by the battery current and voltage control means 44. Even when the key switch 15 is turned off, it continues. When the voltage has reached the specified value, this control is terminated by stopping operation of the drive pump 19. Also in this embodiment, the power of the power battery 2 is used to drive the car, which has great load fluctuations, and the power of the energy battery 1, which provides a constant power, is used for an auxiliary device which is subject to less load fluctuations, such as the air conditioner. This embodiment uses the auxiliary battery 3 as a power source to start up the energy battery 1. This is effective when the power consumption by the drive pump 19 is relatively small.

The present invention makes it possible to meet the requirements for an extensive range of loads from low to high loads, and to improve the traveling characteristics by charging the power battery through the boosting of the power of the energy battery, which continuously generates a constant output. It also makes it possible to meet wide ranging output requirements from low to high loads, thereby improving the traveling characteristics of the electric car.

What is claimed is:

1. In an electric car drive system having a car drive motor powered by a mounted direct current power supply, and a control system including a signal generating means to generate signals which control said motor speed;

wherein said direct current power supply comprises:

a power battery having secondary cells connected to said motor;

a voltage increasing circuit; and an energy battery comprising fuel cells connected in parallel to said power battery via said voltage increasing circuit;

the electric car drive system further comprising:

battery current and voltage control means which controls said voltage increasing circuit based on the current or voltage of any one of said power battery, said energy battery and said motor, and which keeps the voltage of said direct current power supply within a specified range, including charge control means which charges said power battery using said energy battery when the charge of said power battery is below a specified value, and suspends charging of said power battery when said charge is equal to or greater than the specified value.

2. In an electric car drive system having a car drive motor powered by a mounted direct current power supply, an inverter to convert the direct current power supply into an alternating power supply of variable voltage and frequency, a car driving three-phase alternating current motor, a signal generating means to generate signals for controlling said inverter, and a key switch;

wherein said direct current power supply comprises:

a power battery having secondary cells connected to said three-phase alternating current motor;

a voltage increasing current; and an energy battery which comprises fuel cells generating substantially constant outputs at substantially all times and which is connected via the voltage increasing circuit to said power battery.

the electric car drive system further comprising:

battery current and voltage control means which controls said voltage increasing circuit based on the current or voltage of any one of said power battery, said three-phase alternating current motor and said inverter, and which keeps the voltage of said direct current power supply within a specified range, including charge control means which charges said power battery using said energy battery when the charge of said power battery is below a specified value when said key switch is turned off, and suspends charging of said power battery when said charge is equal to or greater than the specified value.

3. An electric car drive control system provided with hybrid battery according to claim 1 or 2 characterized in that said voltage increasing circuit comprises a switching transistor to short-circuit said energy battery, a reactor and a reverse flow preventive diode.

4. An electric car drive control system provided with hybrid battery according to claim 1 or 2 characterized in that said battery current and voltage control means operates to turn off the operation of said voltage increasing circuit and to suspend charging of said power battery through said energy battery when the electric car is in a regenerative mode of recovering braking energy.

5. An electric car drive control system provided with hybrid battery according to claims 1 or 2, characterized in that said electric car has auxiliary equipment including an air conditioner motor, a power steering motor and a vacuum motor, and said auxiliary equipment is driven by said energy battery as a power source.

6. An electric car drive system comprising:

an inverter to convert a direct current power supply from a mounted main power supply into an alternating power supply of variable voltage and frequency;

a car driving three-phase alternating current motor;

a current sensor and a speed sensor to sense current and speed, respectively, of said three-phase alternating current motor;

alternating current command generating means to generate a three-phase alternating current command, based on a value of accelerator opening and an output from said speed sensor;

a PWM signal generating means to generate a signal to control said inverter based on said three-phase alternating current command and current flowing to said three-phase alternating current motor; and a key switch;

wherein said main power supply comprises:

a main contactor;

a power battery having secondary cells connected to said three-phase alternating current motor via said main contactor and said inverter;

a voltage increasing circuit; and an energy battery which comprises fuel cells and which is connected to said power battery via said voltage increasing circuit;

the electric car drive system further comprising:

a current sensor to detect the current of said power battery and said energy battery; and battery current and voltage control means which controls said voltage increasing circuit, based on the current or voltage of any one of said power battery, said three-phase alternating current motor and said inverter and which keeps the voltage of said direct current power supply within a specified range, including charge control means which charges said power battery using said energy battery when the charge of said power battery is below a specified value and when said key switch is turned off, and which suspends charging of said power battery when said charge is equal to or greater than the specified value.

7. A drive control method for an electric car drive control system, wherein said electric car has a car drive motor powered by a mounted direct current power supply, a signal generating means to generate signals for the control of motor speed;

wherein said direct current power supply is composed of:

a power battery having secondary cells connected to said motor; a voltage increasing circuit; an energy battery which comprises fuel cells generating constant outputs at all times and which is connected to said power battery via said voltage increasing circuit; and a key switch to control turning on or off of the power and energy batteries;

the drive control method for the electric car drive control system comprising the steps of:

controlling said voltage increasing circuit, based on the current or voltage of any one of said power battery, said energy battery and said motor, to charge the power battery using said energy battery while keeping the voltage of said direct current power supply within a specified range by:

(i) charging said power battery using said energy battery when the charge of said power battery is below a specified value while said key switch is turned off; and (ii) suspending charging of said power battery when said charge is equal to or greater than the specified value.

8. A drive control method for an electric car drive control system according to claim 7, characterized in that said electric car has auxiliary equipment including a pump to supply fuels and discharge reaction products, an air condition motor, a power steering motor and a vacuum motor, and further comprising the steps of driving said auxiliary equipment by said energy battery as a power source.

9. A drive control method for an electric car drive control system provided with hybrid battery according to claim 7 or 8, further comprising the steps of: turning off the operation of said voltage increasing circuit to suspend charging of said power battery through said energy battery when the electric car is in a regenerative mode of recovering braking energy.

10. A drive control method for an electric car drive control system according to claim 7 characterized in that said electric car has an auxiliary battery to supply power to a pump to supply fuels to said energy battery and discharge reaction products therefore, further comprising the steps of charging said auxiliary battery via a DC/DC converter from said energy battery.

11. An electric car drive control system provided with hybrid battery according to claim 3, characterized in that said battery current and voltage control means operates to turn off the operation of said voltage increasing circuit and to suspend charging of said power battery through said energy battery when the electric car is in a regenerative mode of recovering braking energy.

12. An electric car drive control system provided with hybrid battery according to claim 3, characterized in that said electric car has auxiliary equipment including an air conditioner motor, a power steering motor and a vacuum motor, and said auxiliary equipment is driven by said energy battery as a power source.

13. An electric car drive control system provided with hybrid battery according to claim 4, characterized in that said electric car has auxiliary equipment including an air conditioner motor, a power steering motor and a vacuum motor, and said auxiliary equipment is driven by said energy battery as a power source.

14. A drive control method for an electric car drive control system according to claim 8, characterized in that said electric car has an auxiliary battery to supply power to said pump, further comprising the steps of charging said auxiliary battery via a DC/DC converter from said energy battery.

* * * * *